United States Patent [19]

Langton

[11] Patent Number: 4,909,538

[45] Date of Patent: Mar. 20, 1990

[54] VEHICLE FOR SPORTING USE

[76] Inventor: Aubrey Langton, Sina Farm, Mount, Bodmin, Cornwall, PL30 4DS, England

[21] Appl. No.: 176,738

[22] Filed: Apr. 1, 1988

[30] Foreign Application Priority Data

Apr. 3, 1987 [GB] United Kingdom ................ 8708052

[51] Int. Cl.⁴ ............................................ B62D 61/08
[52] U.S. Cl. ...................................... 280/772; 280/62
[58] Field of Search ...................... 280/772, 112 A, 62, 280/798, 87.01, 87.02 R, 112.2; 180/210, 215, 216, 217

[56] References Cited

U.S. PATENT DOCUMENTS

| Re. 32,031 | 11/1985 | Winchell | 280/112 A |
| 4,020,914 | 5/1977 | Trautwein | 180/210 |
| 4,072,325 | 2/1978 | Bright et al. | 280/772 |
| 4,159,752 | 7/1979 | Kaano | 180/210 |

FOREIGN PATENT DOCUMENTS

| 685880 | 12/1939 | Fed. Rep. of Germany | 280/772 |
| 544720 | 9/1922 | France | 180/217 |

Primary Examiner—Charles A. Marmor
Assistant Examiner—Karin Tyson
Attorney, Agent, or Firm—Gifford, Groh, Sheridan, Sprinkle and Dolgorukov

[57] ABSTRACT

A vehicle for sporting use comprises an articulated frame supporting three or more ground-engaging wheels at least one of which is steerable by means of a suitable steering control member, and a support platform for the user; all the ground-engaging wheels can be turned about respective axes lying generally parallel to the longitudinal central axis of the vehicle and orthogonal to the axis of rotation of the wheels defined by their axles whereby to displace the center of gravity of the vehicle for cornering.

7 Claims, 2 Drawing Sheets

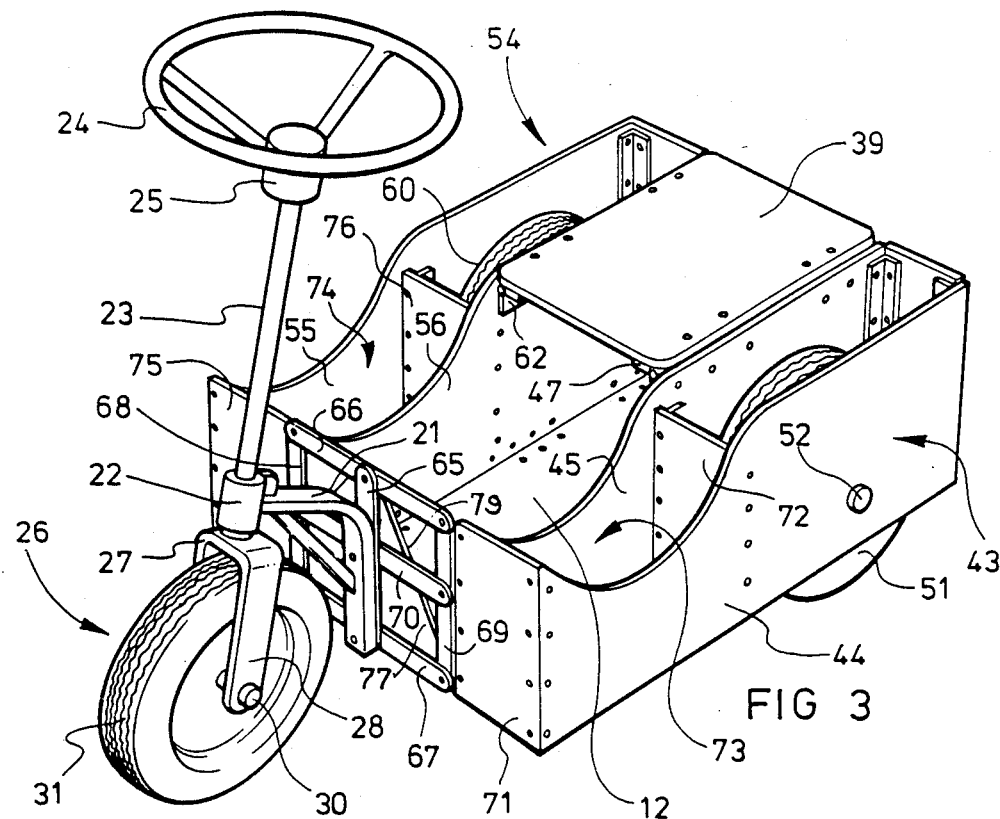
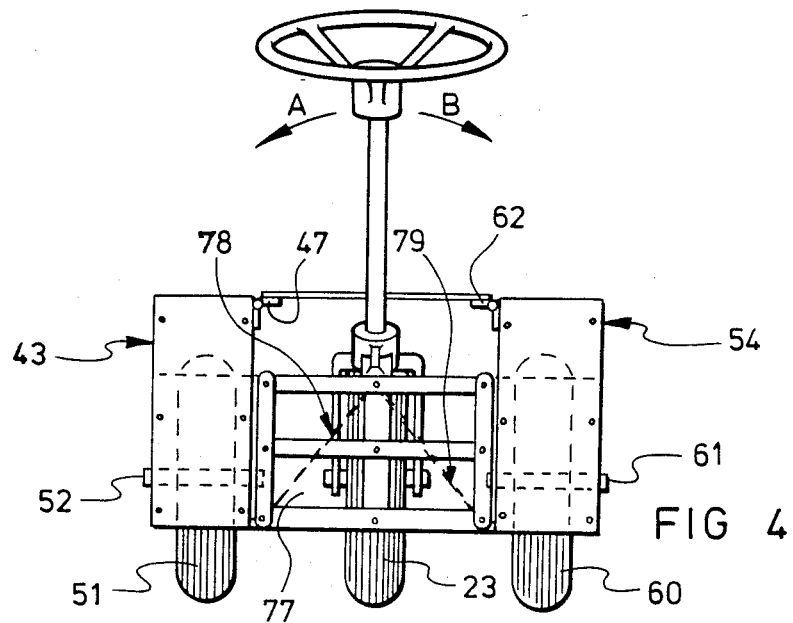

VEHICLE FOR SPORTING USE

BACKGROUND OF THE INVENTION

Skiing and slalom courses for areas subject to snow in the winter are extremely popular and attract much attention. Likewise, bobsleigh runs can be constructed out of packed snow and provide much entertainment and enjoyment. In more temperate regions, however, where winter snow cannot be relied on, there are no corresponding winter entertainments and, even in those regions which enjoy snow in the winter there are no corresponding entertainments for the summer.

It is believed that one of the major reasons why snow-orientated winter sports are so popular lies in the excitement and freedom of a downhill slide, and in the fact that turning from a straight line path involves banking over into the turn. Although two-wheeled vehicles such as bicycles and motor cycles provide this physiological experience there are significant disadvantages to their adoption for a downhill run vehicle, largely due to the lack of directional stability on soft ground such as grassy slopes, and the fact that a smooth tarmac road on which a bicycle or motor cycle is most convenient and comfortable to use, detracts from the freedom and excitement of the open air cross-country experience of skiing or bobsleighing.

OBJECTS OF THE INVENTION

A primary object of the present invention is to provide, a vehicle which can be used on dry land without requiring the frictionless effect of ice or snow, but nevertheless provide the enjoyment and entertainment of a downhill run.

A further object of the invention is to provide a vehicle which can be used on soft ground for a downhill run.

Still another object of the invention is to provide a vehicle which is capable of providing the rider with a similar experience to that of skiing or bobsleighing, namely one in which turning movements involve banking into the turn to retain frictional contact with the ground and displace the centre of gravity to encourage the turning movement.

SUMMARY OF THE INVENTION

The present invention thus provides a vehicle for sporting use, comprising an articulated frame supporting three or more ground-engaging wheels at least one of which is steerable, by means of a suitable steering control member, and a support platform for the user, in which all the ground-engaging wheels can be turned about respective axes lying generally parallel to the longitudinal central axis of the vehicle and orthogonal to the axis of rotation thereof whereby to displace the centre of gravity of the vehicle for cornering.

A vehicle formed as an embodiment of the invention may be provided with neither motor nor brakes in order to offer, in use, a simulation on a grassy open space, of the experience of sleighing or skiing on an open snow-clad slope. The articulated frame of the vehicle of the present invention may comprise a parallelogram linkage joining two of the wheels which are rotatable about respective axes which are aligned with one another when the vehicle is in the upright, straight-ahead position. These wheels are preferably mounted in box-like casings supporting opposite ends of the axles so that directional stability is achieved. The box-like wheel casings form two parallel limbs of the parellologram linkage defining the structure of the vehicle, and the other two limbs may be constituted by a seat platform or frame and a foot rest platform or support frame therefor. In such a configuration, therefore, tilting of the vehicle as a whole can take place about a family of axes parallel to the longitudinal central axis whereby to displace the centre of gravity of the vehicle, and that of a rider, towards the inside of a turn when cornering. The wheel configuration is preferably that of a three-wheel vehicle or tricycle with two wheels side by side on a common axis and with the third wheel positioned at the front. Such a front wheel may be carried in forks supported pivotally on a bearing at one end of a lever arm joined by a central torsion bar mounted on the footrest platform and having a secondary lever arm at the other end, pivoted at its free end to the seat platform. In such a configuration the front, steerable wheel and the two rear wheels can all be tilted by the same angle with respect to the plane of each wheel in the upright orientation, in order to displace the centre of gravity inwards towards the centre of a turn. As an alternative a three-wheel configuration with a steerable rear wheel may be employed, or a four-wheel configuration if greater stability is sought and the greater mechanical complexity and increased stresses can be tolerated.

The steering control member may be any suitable type, and may include handlebars, a steering wheel or even in suitable embodiments, a tiller.

Other features and advantages of the invention will become more apparent from a study of the following description of two preferred embodiments thereof, in which reference is made to the accompanying drawings, provided purely by way of non-limitative example.

BRIEF DESCRIPTION OF THE DRAWINGS

FIG. 3 is a perspective view similar to that of FIG. 1, showing a second embodiment of the invention; and .

FIG. 4 is a rear view seen in the direction of the arrows IV—IV of FIG. 3.

DESCRIPTION OF THE PREFERRED EMBODIMENTS

Figure 1:
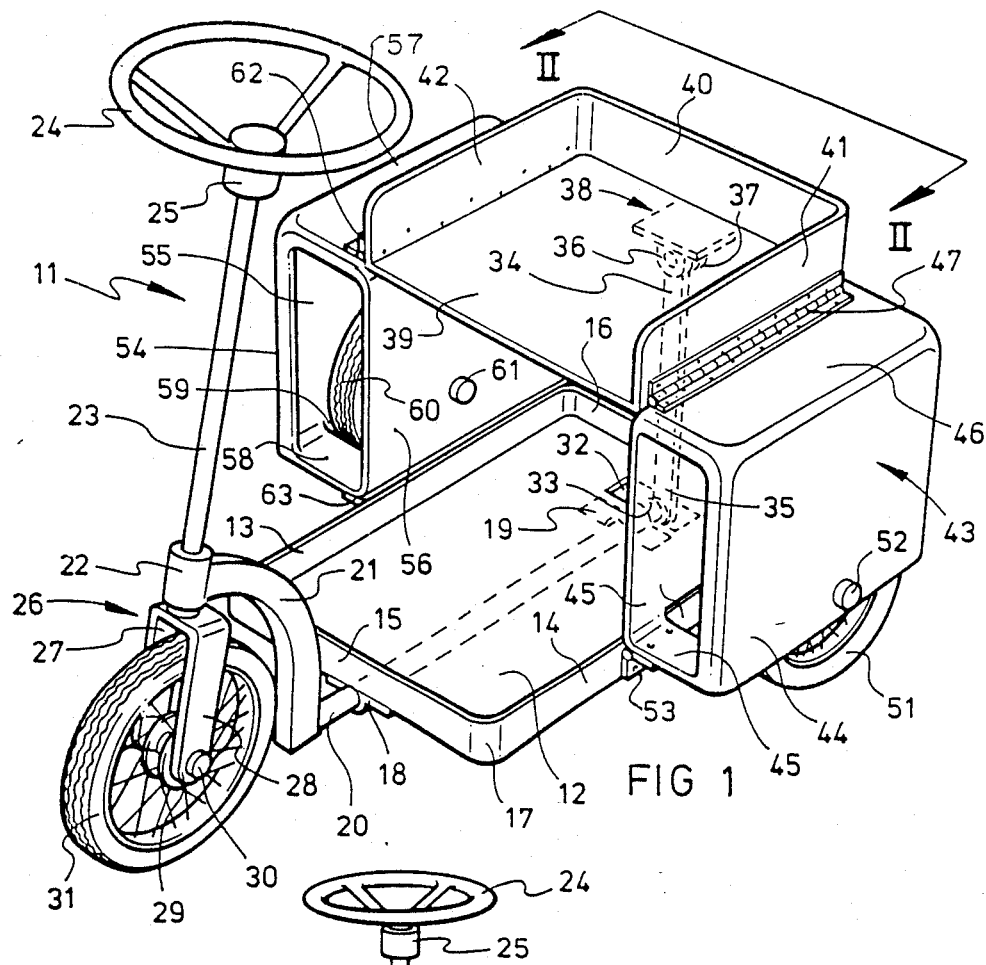
FIG. 1 is a perspective view of a first embodiment of the present invention.
Figure 2:
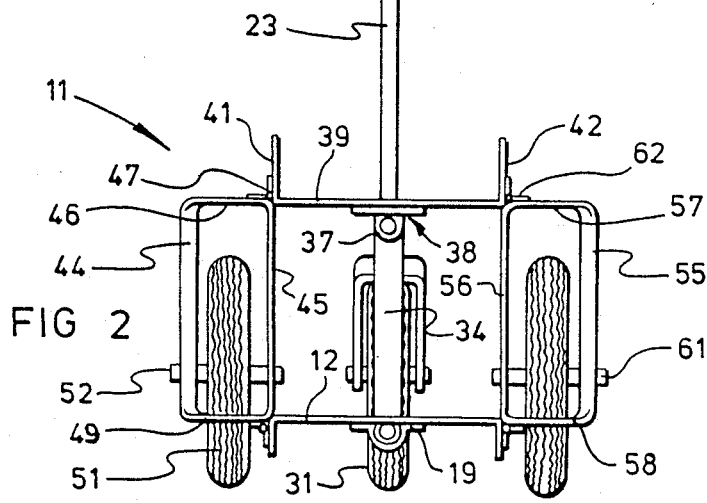
FIG. 2 is a rear view taken from the direction of the arrow II of FIG. 1.

Referring now to the drawings, the embodiment shown in FIGS. 1 and 2 is generally indicated with the reference numeral 11 and comprises a main foot rest platform 12 having upstanding side walls 13, 14 and upstanding front and rear walls 15, 16 which, in the embodiment shown, are joined by rounded corner portions 17 in order to minimise any danger from sharp corners or projections during use of the vehicle. Beneath the platform 12 are two pivot mountings 18,19 aligned along the central longitudinal axis of the vehicle 11, and secured to the underside of the platform 12. Housed within the mountings 18,19 is a torsion tube 20 carried beneath the platform 12. At its forward end the torsion tube 20 is secured (by means not shown) to an arcuate lever arm 21 having a pivot bearing 22 at its free end. The pivot bearing 22 is illustrated as a cylindrical plain bearing and the length of which is substantially greater than its diameter for reasons which will be explained in more detail hereinbelow. Likewise, the arcuate lever arm 21 is a rigid robust member capable of applying a torsion to the torsion tube 20 when turned about an axis coincident with that of the torsion tube 20, again as will be described in more detail hereinbelow.

Passing through the cylindrical bearing 22 is a steering column 23 surmounted at its upper end by a steering wheel 24 fixedly secured by a steering wheel hub 25 so that turning movement of the steering wheel 24 causes corresponding turning movement of the steering column 23. At its lower end the steering column 23 is secured to a fork member 26 having two arms 27,28 lying parallel to one another and to the axis of the steering column 23, and each carrying a bearing 29 at its lower end for receiving an axle 30 of a front wheel 31. The front wheel 31 can turn about its axle 30 within the forks 26 during normal forward running of the vehicle 11, and can be turned about an axis coincident with the axis of the steering column 23 defined by the axis of the bearing 22 upon turning of the steering wheel 24 to the left or right from the straight ahead or forward position illustrated in FIG. 1.

At a position spaced slightly forwardly of the rear wall 16 the foot rest platform 12 has an opening 32 immediately behind the location of the bearing mount 19 which carries the rear end of the torsion tube 20. The rear end of the torsion tube 20 is identified with the reference numeral 33 and at this point the torsion tube 20 is connected to a rigid straight lever arm 34 with a secure fixed coupling such that turning movements of the torsion tube 20 about its axis are transmitted to the rear lever arm 34 as arcuate movements about the lower end 35 thereof which is connected to the rear end 33 of the torsion tube 20. At its upper end the lever 34 passes between two lugs 36,37 of a pivotal mount generally indicated 38 which is secured to the underface of a seat platform generally indicated 39 lying parallel to and above the footrest platform 12.

The seat platform 39 is generally rectangular and has an upstanding rear wall 40 and left and right upstanding walls 41,42 forming an encircling guard around the side and rear parts of the seat platform 39. There is no front wall to the seat platform 39 so that a user seated thereon can rest his or her feet on the footrest platform 12 in a convenient and comfortable manner.

Hingedly attached to the outside of the left upstanding wall 41 of the seat platform 39 is a box-like wheel support structure generally indicated 43 which, for convenience hereinbelow, will be referred to generally as a "wheelbox". The wheelbox 43 has two rectangular parallel side walls 44,45 joined at the top by a top wall 46. The pivotal connection between the wheelbox and the upstanding side wall 41 of the seat platform 39 is effected by means of a piano-type hinge 47 which extends along substantially the full length of the top wall 46 and of the side wall 41 of the seat platform 39. The wheelbox 43 has a bottom wall 49 with an opening 50 therein through which projects a wheel 51 carried on an axle 52 mounted in bearings (not shown) carried by the side walls 44 and 45 of the wheelbox 43. The axle 52 is securely located in the bearings in these side walls 44 and 45 so that the wheel 51 is free to rotate about the axle 52 but is securely located with respect to its running orientation to the wheelbox 43. Any change in the orientation of the wheelbox 43 is therefore matched equally by changes in the orientation of the wheel 51. Finally, the wheelbox 43 is secured by a hinge 53 to the upstanding side wall 14 of the footrest platform 12.

A similar wheelbox 54 is provided on the right hand side of the vehicle 11, and has a similar structure comprising an outer side wall 55 and an inner side wall 56 joined by a top wall 57 and a bottom wall 58, the latter of which has an opening 59 in it to allow a wheel 60 mounted on an axle 61 to project therethrough. The axle 61 is mounted on bearings (not shown) fixedly carried in the side walls 55 and 56 so that the wheel 60 is free to rotate about the axle 61 but secured as far as its orientation is concerned to follow the orientation of the wheel box 54. The upper wall 57 of the wheelbox 54 is pivoted by a piano-type hinge 62 to the side wall 42 of the seat platform 39, and a hinge 63 interconnects the lower wall 58 of the wheelbox 54 with the upstanding side wall 13 of the footrest platform 12.

The wheelboxes 43,54 are strongly made rigid elements having rounded corners as illustrated in the drawing in order to minimise any risk from sharp edges during use. These two wheelboxes lie parallel to one another, each in a respective upright plane, and are joined by two substantially horizontal planar members comprising the seat platform 39 and the footrest platform 12. These four hingedly connected members constitute a parallelogram linkage which, as can be seen from FIG. 2, normally lie in a rectangular configuration with the platforms 39 and 12 horizontal and the wheelboxes 43 and 54 vertical.

In use of the vehicle 11 a rider sits on the platform 39 with feet resting securely and comfortably on the platform 12. Steering movements of the steering wheel 24 are transmitted via the steering column 23 and forks 26 to the front steering wheel 31. Should speed increase, such as on a downhill run, additional turning effect can be achieved by displacing the centre of gravity of the rider/vehicle assembly towards the inside of the turn by physically displacing the steering wheel 24 in that direction. In this movement the steering column 23 acts as a lever and, via the bearing 22 and the lever arm 21 causes the torsion rod 20 to turn about its axis in a corresponding direction. This movement is transmitted via the connection 33 to the lower end 35 of the lever arm 34 and causes displacement of the seat platform 39 in the same direction, this movement being allowed by turning movement of the wheelboxes 43 and 54 about the hinged connections 47 and 62 to the seat platform 39 and 53 and 63 to the footrest platform 12. The vehicle can be moved back to the upright configuration again simply by displacing the steering wheel 24 in the opposite direction from that which caused the initial leaning movement and the whole assembly will then regain the upright configuration illustrated in FIG. 2. This makes it possible for a rider, effectively, to "bank" into a turn enabling much greater speeds to be achieved safely, whilst contributing to the excitement of the ride.

Referring now to FIGS. 3 and 4, the alternative embodiment shown has many components in common with the embodiment of FIGS. 1 and 2 and these are identified with the same reference numerals.

The steering wheel 24, steering column 23 and front wheel 31 are exactly identical, but instead of being mounted via the arcuate arm 21 onto a torsion tube 20, the arcuate arm 21 is connected to a central upright 65 of a parallelogram linkage composed of two horizontal flat metal links 66, 67 and two similar vertical flat metal links 68, 65. A further horizontal reinforcement rod 70 joins the mid points of the upright links 68, 69 and these latter are secured to the front edges of the wheel boxes 54, 43 respectively.

In this connection, the wheel boxes 43, 54 differ from those in the embodiment of FIG. 1 in that they extend forwardly to the front edge of the central platform 12 and this latter is narrower than in the embodiment of FIG. 1 as is the upper platform 39 which in the embodiment of FIG. 1 is a seat rest platform. The outer and inner side walls 44 and 45 of the wheel box 43 extend forwardly and are spanned by a front wall 71 and an intermediate wall 72, whilst there is no top wall 46 and the wheel 51 is visible through the top of the wheel box 43. The two transverse walls 71, 72 and the front parts of the side walls 44, 45 form a foot well 73 having a floor (not shown in FIG. 3) on which the user can place one foot. The other foot is placed in a foot well 74 defined by the forward portions of the inner and outer side walls 56, 55 respectively and transverse walls 75, 76 respectively.

In this embodiment, when the steering wheel 24 is swung through an arc laterally as indicated by the arrows A, B of FIG. 4, the parallelogram linkage comprising the links 68, 69 and the horizontal links 66, 67 and 70 allow the wheel boxes to turn about their longitudinal parallel axes, but in this embodiment, because the user places his feet on the floor of the foot wells 73, 74 these tilt also enabling the user, who stands on the trolley in this embodiment rather than sitting on the platform 39 as in the embodiment of FIG. 1, to lean into the curve more effectively. In order to limit the tilting movements triangular abutment plates 77 ( shown in broken outline in FIG. 4) are provided at the front and rear ends of the base platform 12 to provide two inclined surfaces 78, 79 against which the inner side walls 45, 56 of the wheel boxes 43, 54 respectively can contact to determine the maximum inclination which the trolley can achieve.

Although embodiments having no motor and no brakes have been described herein by way of example it will be appreciated to those skilled in the art that motors and/or brakes may be provided. The foregoing description is therefore to be read as exemplary and non-limiting and the scope of the present invention is to be determined only by reference to the following Claims.

I claim:

1. A vehicle for sporting use, said vehicle comprising in combination:
    an articulated frame comprising a parallelogram linkage of articulated frame members,
    at least three ground-engaging wheels operatively connected to said articulated frame for rotation about respective wheel axes, said articulated frame being tiltable for tilting said ground-engaging wheels about respective axes lying generally parallel to the longitudinal central axis of said vehicle and orthogonal to said respective wheel axes whereby to displace the centre of gravity of said vehicle for cornering,
    at least one of said ground-engaging wheels being a steerable wheel and two of said ground-engaging wheels being located to turn about a common axis when said vehicle is in the upright straight ahead position, each of said two ground-engaging wheels being mounted for rotation about a respective axle carried at both ends by a support member forming part of said articulated frame, said support members for said two ground-engaging wheels being essentially box-like casings having two opposite lateral walls carrying bearings for respective ends of associated said axles, said two box-like casings comprising two parallel links of said parallelogram linkage of articulated frame members,
    a steering control member operatively connected to said at least one steerable ground-engaging wheel.

2. The vehicle of claim 1, wherein the other two links of said parallelogram linkage of articulated frame members are constituted by a generally horizontal footrest platform and a seat panel spaced therefrom.

3. The vehicle of claim 1, wherein said box-like casings have forwardly projecting sides and respective floor members constituting inclinable footrests the inclination of which follows that of said two ground-engaging wheels as they are tilted about said respective parallel longitudinal pivot axes.

4. The vehicle of claim 3, wherein said forwardly projecting sides and said floor members define respective upwardly open footrest boxes for receiving the user's feet, and wherein the forward ends of said footrest boxes are linked together by at least one secondary reinforcement member.

5. The vehicle of claim 4, wherein said secondary reinforcement member forms part of a secondary parallelogram linkage to which said steering control member is connected whereby to transfer forces from said steering control member to said footrest boxes for tilting said ground-engaging wheels about their said parallel longitudinal pivot axes.

6. The vehicle of claim 1, wherein said steering control member includes an elongate column pivotally mounted for turning movements about its own length, fork means connecting said steering control column to said steerable wheel of said vehicle whereby to apply steering movements to said vehicle.

7. The vehicle of claim 1, wherein said steering control member is connected to one end of a longitudinal torsion bar the other end of which is linked to said parallelogram linkage of articulated frame members, said torsion bar acting to transfer tilting forces from said steering control member to said articulated frame members and thereby to said two of said ground-engaging wheels.

* * * * *